US006952558B2

(12) United States Patent
Hardacker

(10) Patent No.: US 6,952,558 B2
(45) Date of Patent: Oct. 4, 2005

(54) WIRELESS SPORTS VIEW DISPLAY AND BUSINESS METHOD OF USE

(75) Inventor: Robert L. Hardacker, Escondido, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 710 days.

(21) Appl. No.: 09/785,205

(22) Filed: Feb. 20, 2001

(65) Prior Publication Data

US 2002/0115454 A1 Aug. 22, 2002

(51) Int. Cl.$^7$ ................................................ H04H 7/00
(52) U.S. Cl. ................... 455/3.06; 455/414.1; 348/553; 348/559; 340/825.36
(58) Field of Search .......................... 455/414.1–414.3, 455/414.4, 3.06, 517; 348/553, 559; 340/825.36; 725/36, 45, 51, 64; 705/26, 67, 75, 76

(56) References Cited

U.S. PATENT DOCUMENTS

| | | | | |
|---|---|---|---|---|
| 5,023,706 A | * | 6/1991 | Sandberg ..................... 348/838 |
| 5,513,384 A | * | 4/1996 | Brennan et al. ......... 455/180.1 |
| 5,663,717 A | * | 9/1997 | DeLuca ................. 340/825.36 |
| 5,729,280 A | * | 3/1998 | Inoue et al. ................ 725/101 |
| 5,842,010 A | | 11/1998 | Jain et al. |
| 5,870,030 A | | 2/1999 | DeLuca et al. |
| 5,884,262 A | | 3/1999 | Wise et al. |
| 5,969,715 A | | 10/1999 | Dougherty et al. |
| 5,982,520 A | | 11/1999 | Weiser et al. |
| 6,073,171 A | * | 6/2000 | Gaughan et al. ............ 725/110 |
| 6,085,101 A | | 7/2000 | Jain et al. |
| 6,434,398 B1 | * | 8/2002 | Inselberg .................... 455/517 |
| 6,728,518 B1 | * | 4/2004 | Scrivens et al. ........... 455/90.2 |
| 2002/0063799 A1 | * | 5/2002 | Ortiz et al. ................. 348/559 |

\* cited by examiner

Primary Examiner—Stephen M. D'Agosta
(74) Attorney, Agent, or Firm—Thomas F. Lebens; Fitch, Even, Tabin & Flannery

(57) ABSTRACT

An on-location local multicast distribution system and business method therefor. Contemporaneous information is continuously provided to a local distribution unit on a particular event (e.g., a NASCAR race) from multiple input devices, such as video cameras and microphones. The distribution unit simultaneously transmits audio, video and event specific information to multiple uniquely identifiable output devices, each in the hands of a registered attendee. The input devices are in wireless Communication with the distribution unit and the distribution unit is in wireless Communication with the output devices. The uniquely identifiable output devices include a display such as a liquid crystal display and may be for example, a personal digital assistant (PDA). Registered attendees may selecting which of the multiple inputs are received. For an auto race the local distribution unit provides audio and video feeds from pit crews, race cars and individual driver and race car statistics to individual attendees as selected.

2 Claims, 2 Drawing Sheets

WIRELESS SPORTS VIEW DISPLAY AND BUSINESS METHOD OF USE

BACKGROUND OF THE INVENTION

1. Field of the Invention

The present invention generally relates to distributing event information to attendees at the event and, more particularly, to distributing audio and video to auto racing fans attending an auto race.

2. Background Description

Short range wireless is used, currently, for selective communication during sporting events. NASCAR drivers use short range wireless to communicate with their pit crews during races, for example. In addition, fans and spectators attending races are allowed, for a small fee, to listen in on these conversations using specially-equipped radio receiver headsets that are programmed to the same wireless frequencies used by the drivers and their pit crews. Some fans may rent and others may own the headsets and, their racing experience is enhanced by listening to ongoing live conversations. This service allows fans to participate more fully in the event.

Often, at the same events, television broadcasters employ multiple cameras, video feeds from each are selected, individually, by a director located in a local broadcast van, for example. The selected video feed is uplinked to a home station and subsequently broadcast. Some of these cameras may be strategically placed, e.g., on board participating race cars. These on-board cameras have become ubiquitous within the sports broadcast industry and especially for auto racing, adding still another "in-car" perspective.

On-board, "seat-back" fixed cameras and in-car microphone installations, by their nature, have higher initial installation costs and rely upon being used at multiple events at the same fixed venue, e.g., the racetrack, to recover the initial investments. Since initial costs are amortized over use, how quickly each of these installations become profitable depends upon the frequency of events (races) at the particular venue (track). Other closed-circuit monitors sometimes may be installed in executive suites, lounges, etc. These monitors may offer a wide viewing selection but, have limited sports facility viewership and, so, have a restricted or limited return on investment.

Usually, attendees of typical live sporting events are limited to a single perspective. As is evident from the success of sports business ventures, such as baseball camp, many fans would willingly pay additional money to further enhance their sporting event experience. Also, since fans attending an event clearly have some interests in common, advertisers can benefit from getting ads to the fans' attention, as can be seen from the abundance of brand names displayed around each event, e.g., on race cars, on driver and crew apparel, etc.

Thus, there is a need for improving distribution of audio and video, as well as, event related information to attendees at sporting events.

SUMMARY OF THE INVENTION

It is therefore a purpose of the present invention to improve the experience of attendees at sporting events;

It is another purpose of the present invention to enhance information that is provided to fans at auto races;

It is yet another purpose of the present invention to provide auto race fans with selectable live audio, live video and data feeds at the race track during auto races.

The present invention is a local multicast entertainment system and business method for entertainment events and in particular sporting events such as auto races. Strategically placed cameras and microphones stream video and audio, which is received by a system redistribution server. Wireless personal digital assistants (PDA) or, semi-dumb "PDA-like" devices, each equipped with a display and 2-way transmission capabilities, receive wireless feeds of selectable contemporaneously available multimedia data from a local multicast system server. The multicast system simutaneously provides downstream data, audio, video, and advertisements to the viewer devices, while receiving devices send upstream data to the service provider. Upstream data includes, for example, payment authorization as well as requests for information to be displayed on the device. Downstream data may include statistics on drivers, players, teams, cars, venue, record holders, etc., and may be extracted from a database and provided upon request. The database may be located locally at the multicast server or, located on a remotely connected server, for example, connected over the Inernet. Also, on-screen advertising time can be sold to advertisers for an additional revenue stream and/or to subsidize viewer rental. Participating advertisers may include venue-specific concessionaires for food, drink, memorabilia, etc., and also may include local/regional/national vendors with a targeted audience.

Advantageously, the portability of cameras and terminal devices of the present invention allows these devices to be used almost anywhere, being passed from venue to venue like other concessions at these types of events. Participating users or fans are provided on-demand access to different camera angles, audio sources and related information from the database. Thus, fans are provided with a substantially enhanced (sporting) event experience. Significant additional revenue may be derived from viewer rental, service participation (subscription) fees and on-screen advertising.

BRIEF DESCRIPTION OF THE DRAWINGS

The foregoing and other objects, aspects and advantages will be better understood from the following detailed preferred embodiment description with reference to the drawings, in which.

DETAILED DESCRIPTION OF A PREFERRED EMBODIMENT OF THE INVENTION

Figure 1:
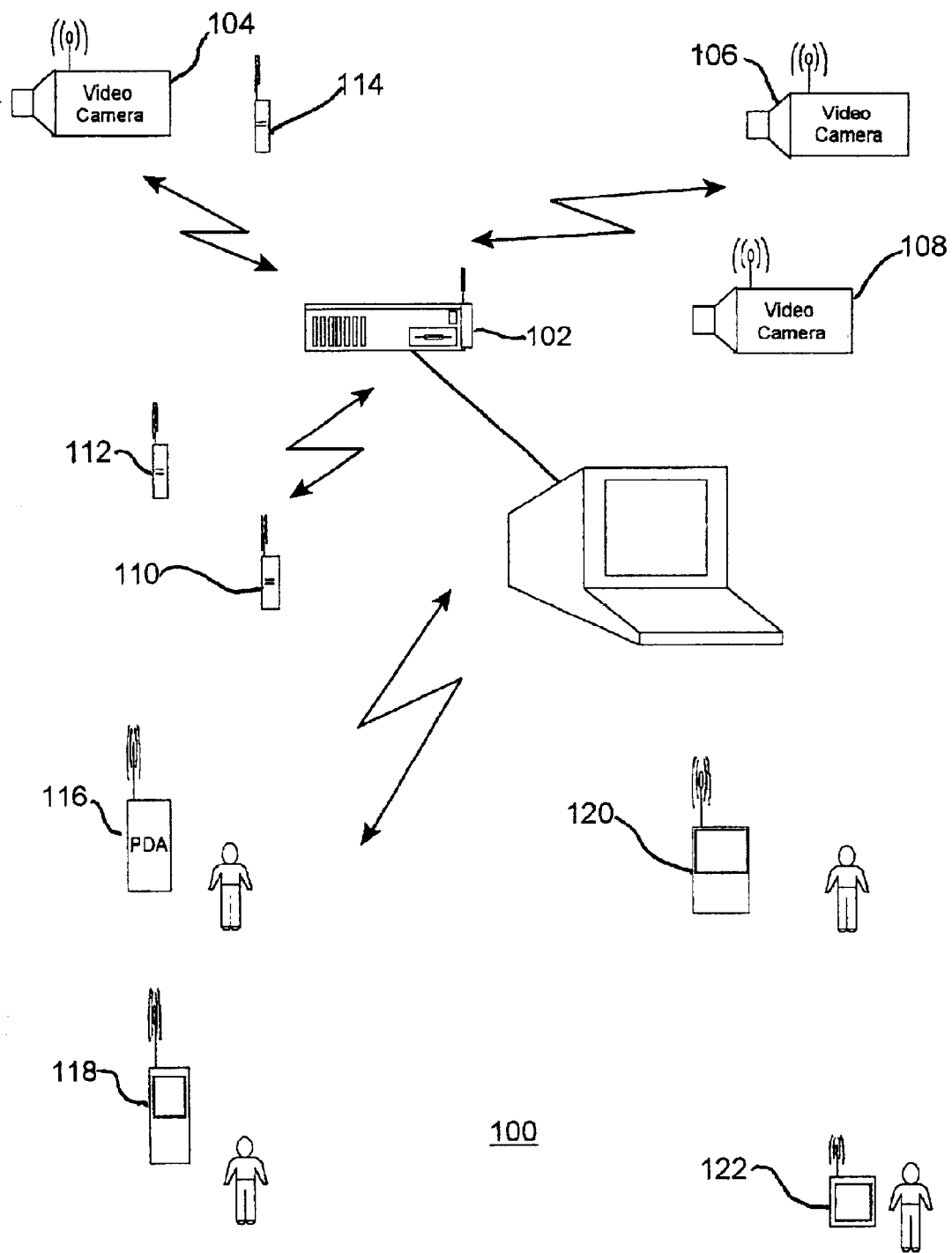
FIG. 1 shows a preferred embodiment local multicast entertainment system.

Referring now to the drawings, and more particularly, FIG. 1 shows a preferred embodiment local multicast entertainment system 100 according to the present invention. The local multicast system 100 includes one or more transceivers/servers which are distribution units 102 receiving and redistributing local audio and video signals. Strategically placed video cameras 104, 106, 108 and microphones 110, 112, 114 stream local video and audio to the distribution unit 102. Streaming video and audio are redistributed by the distribution unit to authorized viewers or display devices 116, 118, 120, 122. Each uniquely identifiable display device 116, 118, 120, 122 receives selected audio and video streams from the distribution unit 102. Preferably, video cameras 104, 106, 108, microphones 110, 112, 114 and display devices 116, 118, 120, 122 are in wireless communication with the distribution unit 102.

The system and method of the present invention may be used at large entertainment events, especially sporting events such as, for example, NASCAR racing, motorcycle racing, concerts, political conventions or any event where cameras and microphones may be strategically located. When used at a NASCAR race, cameras 104, 106, 108 and microphones 110, 112, 114 may be placed for example, in various race cars, in the pits, or anywhere else that may be appropriate, i.e., where audio/video is collected and distributed over a closed circuit network or otherwise rebroadcast. Also, on-screen advertising time can be sold to advertisers for an additional revenue stream and/or to subsidize viewer rental. Participating advertisers may include venue-specific concessionaires for food, drink, memorabilia, etc., and also may include local/regional/national vendors with a targeted audience.

Each distribution unit 102 is a local multicast system server receiving and transmitting wireless feeds of contemporaneously available multimedia data that are selectively provided to authorized display devices 116, 118, 120 and 122. So, the distribution unit 102 provides downstream data, audio, video, and advertisements to the display devices 116, 118, 120, 122, which return upstream data to the server. Downstream data may include statistics on drivers, players, teams, cars, venue, record holders, etc., and may be extracted from a database and provided upon request. The database may be local at the multicast server 102 or, located on a remotely connected (not shown) server, for example, connected over the Internet. Upstream data includes, for example, payment authorization as well as requests for information to be displayed on the device 116, 118, 120, 122.

Accordingly, each display device 116, 118, 120, 122 is 2-way wireless transmission capable, has audio capability and may include a lightweight video display, such as a flat panel display or liquid crystal diode (LCD) display. The display devices 116, 118, 120, 122 may include wireless personal digital assistants (PDAs), e.g. operating in client mode, and special purpose display devices, each of which is similar to a PDA, but does not necessarily include all of the function of a PDA. The display devices 116, 118, 120, 122, each include a data or command entry function to provide information selection and requests to the transceiver. Data entry may be with a stylus applied to a touch screen, by pressing buttons (not shown), through voice commands or, by any other appropriate data entry function.

Since less intelligence is required than is normally found in a PDA, a less complex display unit 118, 120, 122 may be employed. Multicast communication between the display devices 116, 118, 120, 122 and the distribution unit 102 may be based on the IEEE 802.11 wireless local area network (LAN) specification. If desired, any other suitable similar communication standard or proprietary implementation may be substituted such as, for example, Bluetooth. However, the state-of-the-art IEEE 802.11a wireless LAN specification has distinct performance advantages over Bluetooth, in particular its data rate, the number of available simultaneous channels and currently available off the shelf network hardware.

Figure 2:
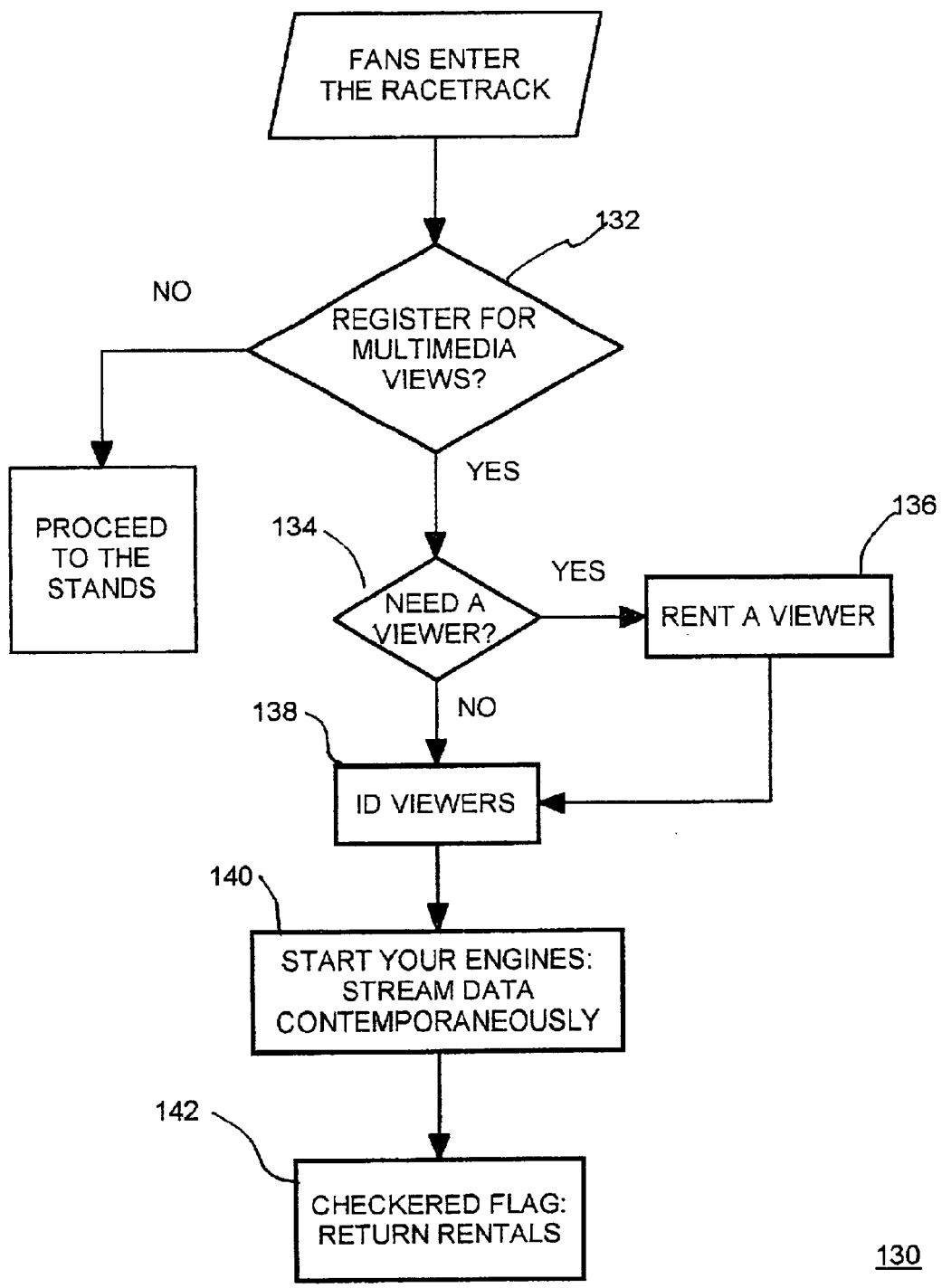
FIG. 2 is a flow diagram showing a method of doing business according to the preferred embodiment of the present invention.

FIG. 2 is a flow diagram showing a method of doing business 130 according to the preferred embodiment of the present invention. First in step 132, fans, interested in receiving streaming multimedia feeds during the event, e.g., the NASCAR race, register and, optionally, a registration fee may be collected. In step 134, fans that do not own viewers or display devices 116, 118, 120, 122 are afforded an opportunity to rent one. Equipment (display device) rentals may be secured in step 136 with a cash deposit or, preferably, by credit card to cover the potential loss of display devices 116, 118, 120, 122 that may not be returned at the end of an event. Additionally, where a credit card is used to secure the display device, on-site purchases (e.g., memorabilia, concessions, etc.) can be made, interactively, without requiring transmission of additional personal information.

Next, in step 138 a unique address is retrieved from registered fans for each display device 116, 118, 120, 122, rented or owned. For identification within the system, each display device 116, 118, 120, 122 has an unique Internet protocol (IP) like address or identification tag, which is provided to the multicast service provider upon registration. The distribution unit 102 passes data and multimedia feeds only to registered users, typically, paying customers. For authentication, a typical state-of-the art public/private key encryption system may be used with keys being exchanged at registration, e.g. when a fan signs in or rents a display.

Once registered and identified, each fan may select audio, video and data source and begin receiving a multimedia data stream. So, in step 140, the distribution unit 102 begins streaming multiple streams of multimedia data to registered display devices. For efficiency, transmitted data is compressed, where applicable, prior to transmission and decompressed upon receipt. The distribution unit 102 may compress the streaming audio and video using the Motion Picture Experts Group release 4 (MPEG4) technology standard and transmit the MPEG4 data using the video H.263 Quarter Common Interface Format (QCIF) transmission standard to transfer data at a rate suitable for a small screen size. Optionally, full Common Interface Format (CIF) may be used at higher data transmission rates for display on larger flat panel displays. As noted above, the multimedia data streams include live transmissions from the cameras 104, 106, 108 and microphones 110, 112, 114 as well as event related data (e.g., event background information such as car and driver statistics) and advertising, if included. Once the event is concluded, in step 142 rented displays are returned.

The preferred distribution unit 102 is a wireless communication transceiver/server or, multicast server, capable of providing multiple short range (<100 meters) downstream feeds of user-selected streaming audio/video at data rates greater than one megabits per second (>1 Mbps). Short range transmission is preferred to limit reception to the general proximity of the particular event. A modern arena or race track extends beyond the short range (<100 meters) limitations of the preferred state of the art wireless LAN systems. Accordingly, analogous to a mini-cellular phone system, if necessary, multiple antennas may be included to ensure complete radio frequency (RF) signal coverage of the entire arena or race track.

Advantageously, fans are offered on-demand contemporaneous access to different camera angles and audio sources in addition to event related information. Further, because of the portable nature of the multicast entertainment system 100 of the present invention, both on the client and server side, the hardware may be used continuously, thereby accelerating initial investment recovery without having to rely solely upon additional events at the same fixed venue. The portability of cameras 104, 106, 108 and microphones 110, 112, 114, as well as the uniquely identifiable display devices 116, 118, 120, 122 of the present invention allows shuttling these devices from venue to venue as is done with other concessions available at these types of events. Further, it should be noted that a feed from a broadcaster could be provided to authorized devices (i.e., to those customers that have paid an additional fee) independent of such an event, and, correspondingly, the requirement of local cameras and microphones. Thus, the service provider's initial investment is lower than traditional seat-back or fixed venue systems, eliminating the manpower/hardware intensive costs limited use associated with a fixed installation.

Also, equipment, service and maintenance costs can be defrayed by selling onscreen ads to advertisers. Income from such ads provide an additional revenue stream and also may be used to subsidize viewer rental. Participating advertisers may be large national corporations but, also can include venue-specific concessionaires for food, drink, memorabilia, etc. Further, customers can order advertised concessions, paid by credit card and delivered to their seat in the stands. Also, such ads provide local/regional/national vendors with a narrowly targeted audience.

While the invention has been described in terms of preferred embodiments, those skilled in the art will recognize that the invention can be practiced with modification within the spirit and scope of the appended claims.

I claim:

1. A method of doing businesses, comprising:

selectively registering fans at a sporting event;

selectively renting viewers to registered fans;

retrieving a unique viewer address from the viewers rented to registered fans;

providing multiple streams of multimedia data to registered viewers, at least one multimedia stream including live transmissions;

retrieving rented viewers from registered fans at the end of said sporting event;

wherein as each fan registers said registering fan pays a fee for receiving said multimedia streams; and wherein registered fans order concessions from registered viewers, ordered concessions being charged to a provided credit card number.

2. A method of doing businesses as in claim 1, wherein said ordered concessions are delivered to corresponding ordering fans.

* * * * *

UNITED STATES PATENT AND TRADEMARK OFFICE
CERTIFICATE OF CORRECTION

PATENT NO. : 6,952,558 B2  Page 1 of 1
APPLICATION NO. : 09/785205
DATED : October 4, 2005
INVENTOR(S) : Hardacker It is certified that error appears in the above-identified patent and that said Letters Patent is hereby corrected as shown below:

In the CLAIMS:

Claim 1, column 6, line 2, change "businesses" to --business--.

Claim 2, column 6, line 18, change "businesses" to --business--.

Signed and Sealed this

First Day of August, 2006

JON W. DUDAS
*Director of the United States Patent and Trademark Office*